Aug. 16, 1960 H. B. SEDGFIELD ET AL 2,949,261
AIRCRAFT NAVIGATION APPARATUS
Filed Feb. 18, 1954
2 Sheets-Sheet 2
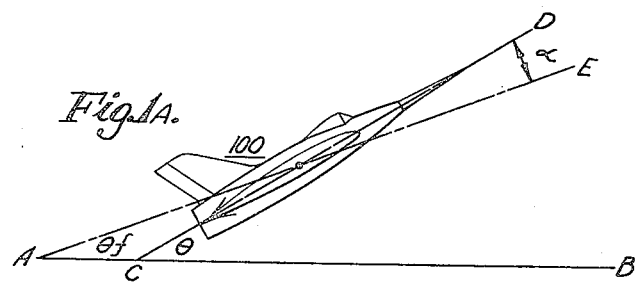
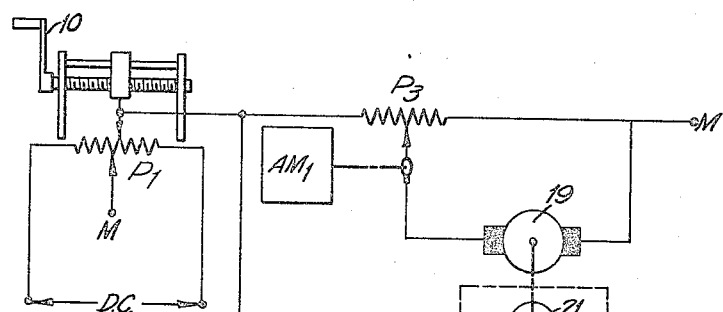
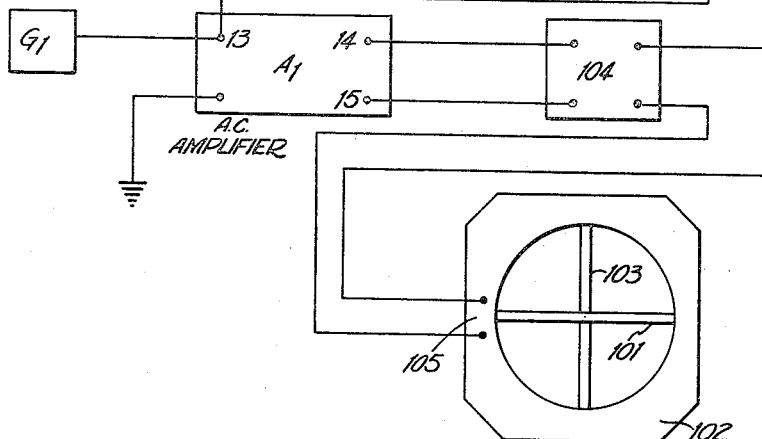
INVENTORS
HUGH B. SEDGFIELD
RICHARD LENNOX-NAPIER
BY
Herbert H. Thompson
ATTORNEY.

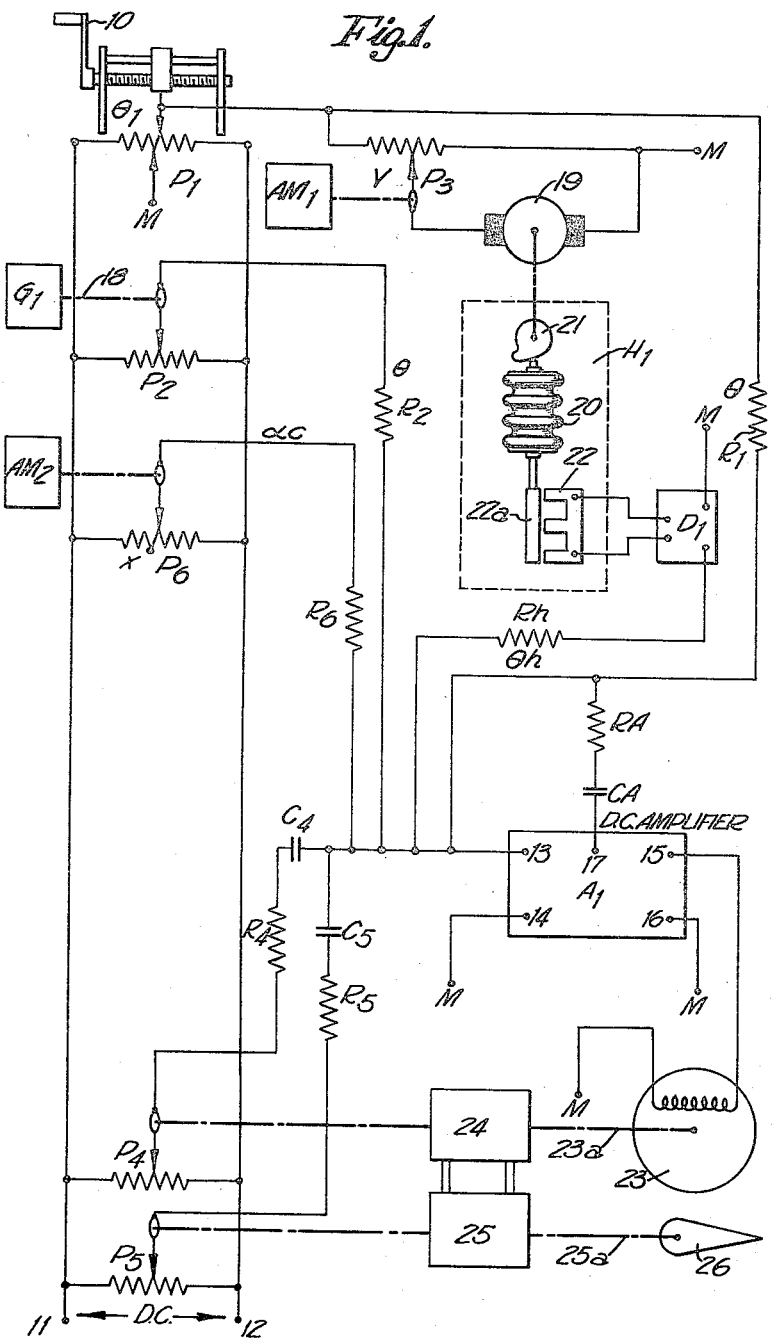

United States Patent Office 2,949,261
Patented Aug. 16, 1960

2,949,261

AIRCRAFT NAVIGATION APPARATUS

Hugh Brougham Sedgfield, Hampton, and Richard Lennox-Napier, Brokenhurst, England, assignors to The Sperry Gyroscope Company Limited, Brentford, England, a British company Filed Feb. 18, 1954, Ser. No. 411,224

Claims priority, application Great Britain Mar. 3, 1953

11 Claims. (Cl. 244—77)

This invention relates to navigation apparatus for use in the control of the pitching attitude of an aircraft. It is equally applicable to automatic control systems and to systems in which the pilot controls the aircraft in response to the indications provided by an indicating instrument, for example so-called flight director systems.

It is normal practice in many types of aircraft control apparatus to provide a controller, the setting of which represents a set angle, which determines the attitude of the aircraft in pitch. Prior systems have operated either automatically or as a result of the pilot controlling the aircraft in response to the indications of an instrument, to make the pitch angle of the aircraft correspond to the input value set in upon the controller.

It has been found desirable in certain cases to control the aircraft so that the angle of elevation of its flight path (often referred to as the flight path angle), rather than its pitch angle, corresponds to the command angle that is the angle set in on the controller, and accordingly it is the object of the present invention to provide a servo system for controlling the flight of an aircraft or an aircraft navigation apparatus which will operate in the above noted manner.

In known servo systems for controlling the pitch angle of an aircraft the servo motor causes the pitch angle of the craft to be controlled in accordance with the difference between two primary control terms, of which one depends on the setting of the primary controller (the pilot's controller) and the other depends on a measure of the pitch angle of the aircraft. In such systems the servo system will operate to cause the pitch angle of the aircraft to correspond to the command angle set in on the pilot's controller. In general the system will thus operate to maintain the pitch angle of the aircraft at the desired setting, although in most cases variations in the speed and in the disposition of the weight of the aircraft and in the velocity and direction of the wind may cause the pitch angle of the aircraft to differ slightly from the desired pitch angle. In any case, however, variations in the velocity and direction of the wind and in the air speed of the aircraft and the density of the ambient air will result in the craft following a flight path that bears no definite relation to the setting of the primary controller. Thus it is desirable to control—not the pitch angle of the aircraft but the angle of elevation of the flight path of the said aircraft. By the term "angle of elevation" we hereinafter desire it to be understood that we mean the angle of inclination in a vertical plane of the flight path with respect to the geohorizontal thereby being inclusive of climb and dive conditions.

One method of controlling the flight path angle is described in co-pending application No. 392,449 of Hugh B. Sedgfield, for Aircraft Navigation Systems filed November 16, 1953. This method is based on the principle that the angle of elevation of the flight path of an aircraft differs from the pitch angle of an aircraft by an angle which is termed the "angle of attack" which depends in the main on the weight of the aircraft and the product of the square of the speed of the aircraft and the density of the ambient air. An auxiliary control term depending upon these extrinsic conditions is combined with the primary and secondary control terms so that the pilot is enabled to set in on his controller the desired angle of elevation of the flight path of the aircraft instead of the pitch angle of the aircraft and the servo system will operate to maintain the pitch of the aircraft and the angle necessary to cause the angle of the flight path to be that desired. The system of the present invention resembles that described in the afore-mentioned co-pending application No. 392,449 in that it enables the pilot to control the aircraft to follow a flight path having a desired angle of elevation but it achieves the result in a different manner.

In the so-called flight director systems it is common practice to provide some measure of the height of the aircraft and to assist the pilot in maintaining his craft in level flight it has also been proposed that the indications provided by a pitch indicating instrument should be modified in dependence on the departure of the craft from a predetermined height. Apparatus that may be considered to perform this function is described in the specification of our Patent No. 2,613,350 to Spencer Kellogg, 2nd, for Flight Indicating System for Dirigible Craft dated October 7, 1952. This apparatus, which we term a flight director, enables information about the craft's departure from certain types of predetermined flight paths in both elevation and azimuth to be displayed on a single cross-pointer indicator. Whilst such instruments assist the pilot to maintain his craft in level flight, or to maintain desired attitude in pitch, they do not provide information that is of direct assistance to him if he desires to follow a flight path having a predetermined angle of elevation other than zero.

It is the object of the present invention to provide navigation apparatus for use in controlling an aircraft to follow a flight path having a desired angle of elevation within more precise limits than heretofore.

According to the present invention we provide aircraft navigation apparatus in which there is produced a control signal, or indication, at least in part, dependent on the difference between the actual height of the aircraft, and a height computed from the speed of the aircraft and a set input value representing the desired angle of elevation of flight path, the control signal, or indication, being utilised in controlling the pitch attitude of the aircraft to cause it to follow a flight path having the said desired angle of elevation.

According to another feature of the invention we provide aircraft navigation apparatus in which there is produced a control signal, or indication, at least in part, dependent on the difference between the rate of change of actual height of the aircraft, and a rate of change of height computed from the speed of the aircraft and a set input value representing the desired angle of elevation of flight path, the control signal, or indication, being utilised in controlling the pitch attitude of the aircraft to cause it to follow a flight path having the said desired angle of elevation.

The invention will be more fully appreciated from the following description reference being had to Figures 1, 1a and 2 of the accompanying drawings in which:

Fig. 1 shows a servo system for controlling the elevation angle of the flight path of an aircraft by means of the elevator in accordance with the setting of a pilot's controller;

Fig. 1a shows the relevant angles and

Fig. 2 shows an embodiment of the invention as applied to navigation apparatus for aircraft such as a flight director.

The servo system of Fig. 1 is a modification of the system described in our British Patent No. 690,982 and certain of the components of the system are described in more detail in that document. The pilot's controller which produces the primary control term that represents the desired angle of elevation of the flight path of the aircraft comprises a manual controller 10. This controller varies the setting of the wiper arm of a potentiometer $P_1$ having its winding connected across supply lines 11, 12 fed from a D.C. source so that the sense and magnitude of the voltage between the wiper arm and the mid point M of the same potentiometer is a measure of the sense and magnitude of the desired angle of elevation of the flight path of the aircraft. The sliding contact is connected through a star-addition resistor $R_1$ to the live input terminal 13 of a high gain D.C. amplifier, shown generally at $A_1$, stabilised against drift in the manner described and claimed in our U.S. Patent 2,730,573, issued January 10, 1956. The reference input terminal 14 of the amplifier $A_1$ is connected to the centre tap M of the potentiometer $P_1$.

A second potentiometer $P_2$ also connected across the D.C. supply lines 11, 12 is controlled by a shaft 18 connected to a gyro vertical (shown as box $G_1$) so that its setting is varied in accordance with the pitch angle of the aircraft with the result that the voltage on the sliding contact is a measure of the pitch angle of the aircraft. The sliding contact of potentiometer $P_2$ is connected through a high-resistance star-addition resistor $R_2$ to the live input terminal 13 of amplifier $A_1$. The winding of a third potentiometer $P_3$ is connected between the wiper arm of the first potentiometer $P_1$ and the said mid point M. The wiper arm of this third potentiometer $P_3$ is positioned by means of an air-speed-measuring device $AM_1$ which may be of any known kind that operates to produce a mechanical displacement which is a function of the dynamic pressure, i.e. a function of the product of the square of the speed of the aircraft and the density of the ambient air. A voltage which is a product of the angle set in on potentiometer $P_1$ and the air-speed of the craft is derived by the cascade arrangement of $P_1$ and $P_3$—this voltage is used to drive an integrating motor 19, the shaft of which rotates at a speed substantially proportional to the voltage across its terminals; as will be shown hereinafter this produces a displacement representing a computed height; $\int V \sin \theta_1 dt$ where V is the airspeed and $\theta_1$ is the desired angle of elevation of the flight path. The error introduced by taking $\sin \theta_1 = \theta_1$ has negligible effect, but may be avoided if necessary by use of a suitable resolver. The shaft of this motor 19 is used to adjust the datum setting of an instrument (shown here by box $H_1$) which includes a member such as a barometric capsule 20 having a dimension depending on the actual height of the aircraft.

The motor shaft of integrating motor 19 is arranged to position the end of the barometric capsule 20 through a non-linear linkage such as a cam 21 in such a way that the rate of movement of the driven end of the barometric capsule 20 is made substantially proportional to the quotient of the rate of movement of the motor shaft and the square root of the density of the ambient air, since the density of the ambient air depends on altitude. In this way the position of the driven end of the barometric capsule is made to depend substantially on the product of the voltage set up on the first potentiometer $P_1$ and the true air speed of the aircraft; and thus on the computed height of the aircraft. Consequently the output signal $\theta_h$ of E type pick-off 22, having an armature 22a connected to the free end of the capsule 20, is made proportional to the difference between the actual height of the aircraft-measured by the application of ambient pressure to the barometric capsule 20 and the value of the height computed from the product of the true airspeed of the aircraft and the desired angle of elevation of the flight path; thus the output signal $\theta_h$ is a height error signal and this is fed via discriminator $D_1$ and then through high-resistance star-addition resistor $R_h$ to the amplifier $A_1$. The non-linear linkage 21 between the motor shaft and the barometric capsule may be arranged to compensate also for non-linearity in the capsule characteristic. Alternatively the rotation of the shaft of integrating motor 19 may be used to modify the output of the pick-off by any suitable means in order to vary the sensitivity or other parameters of the system at different altitudes.

Referring now specifically to Fig. 1a, an aircraft shown generally at 100 has a fore and aft datum or axis line CD at an angle $\alpha$ to the flight path AE. Angle $\alpha$ is the angle of attack. The datum CD and the flight path AE make angles $\theta$ and $\theta_f$ respectively with the geo-horizontal shown as base line AB. It will be readily seen that $$\theta = \theta_f + \alpha \qquad (1)$$

If the air-speed of the craft along AE is $\gamma$ then the actual rate of climb is equal to $\gamma \sin \theta_f$. Consider Fig. 1 in conjunction with Fig. 1a. If now the pilot selects a command angle $\theta_1$ on his controller the desideratum is that the angle of flight path $\theta_f$ shall equal $\theta_1$. By virtue of the combination of $\gamma$ and $\theta_1$ in the system we obtain a computed rate of climb equal to $\gamma \sin \theta_1$.

The electrical signals which constitute the control term to the amplifier $A_1$ of Fig. 1 shall be $\theta$, $\theta_1$, and $\theta_h$ where $\theta_h$ is the height error signal (for ease of presentation the constants of proportionality are omitted). In the steady state $\theta_h$ must be constant, but $\theta_h$ is proportional to $(h - h_c)$ i.e. proportional to $$\int \gamma \sin \theta_f dt + h_0 - \int \gamma \sin \theta_1 dt + h_0$$

where $h$ is the actual height
$h_0$ is the initial height datum
$h_c$ is the computed height $\therefore \int \sin \theta_f dt - \int \sin \theta_1 dt =$ a constant. Now differentiating with respect to time, $\sin \theta_f - \sin \theta_1 = 0$, in which case $$\theta_f = \theta_1$$

It will be appreciated from this that the desideratum mentioned above is fulfilled and that an actual height and a computed height had been obtained by the integration of the rate of change of actual height and the rate of change of computed height.

The value of $h$, the true height, is obtained from the barometric capsule while the computed height $h_c$ is obtained as hereinbefore described from the integrating motor 19 which has a straight line voltage/r.p.m. characteristic and is able thereby to integrate to a close approximation the function $\gamma \sin \theta_1$; and the angular rotation of the motor shaft is therefore an indication of the height of the aircraft above any given datum $h_0$ i.e.

$$h_c = \int \gamma \sin \theta_1 dt + h_0$$

Motor 19 is driven by the voltage obtained from potentiometers $P_1$, $P_3$ in combination with the air-speed-measuring device $AM_1$. The difference of $h$ and $h_c$ provides the height error signal $\theta_h$ which is fed to the amplifier $A_1$ via star-addition resistor $R_h$.

The three inputs to the amplifier $A_1$ i.e. $\theta$, $\theta_1$, $\theta_h$ constitute two primary control terms $\theta$ and $\theta_1$ and a secondary control term $\theta_h$ for the system and are of such a sense that together they provide zero input to the system when the actual elevation angle of the flight path of the aircraft is equal to the command angle set in on the pilot's controller 10.

The control signal is provided at the output terminals 15 and 16 of the amplifier $A_1$ and these are connected to the control winding of an electromagnetic clutch 23 the input member of which is continuously rotated by an electric motor (not shown) and the output member of which operates through shaft 23a to control valve 24 of a hydraulic motor 25 in the manner shown in British Patent No. 690,982. The arrangement is such that the hydraulic motor 25 operates a shaft 25a at a speed that is substantially proportional to the current supplied to the electromagnetic clutch 23, the direction of motion of the shaft corresponding to the direction of the current. Shaft 25a operates the elevator 26 of the aircraft in such a direction that the attitude of the aircraft changes in the direction to cause the total input to the amplifier $A_1$ to be reduced towards zero.

Two tertiary control terms are supplied to the input to the amplifier $A_1$ to prevent instability and over-control. One such control term is provided by a variable potentiometer $P_4$ controlled by the shaft 23a. This potentiometer is connected across the D.C. supply lines 11 and 12 and the apparatus is so set up that in the normal position of the clutch output member, with the hydraulic control valve 24 closed, the adjustable slider is in the centre of the potentiometer and is therefore at zero potential. When the clutch output member is displaced from this normal position, the adjustable tapping is at a potential representing by its magnitude and sense the displacement of the clutch output member. This voltage is fed to the live input terminal 13 of the amplifier $A_1$ through a resistor $R_4$ and a capacitor $C_4$, so that component current supplied to the input of the amplifier on displacement of the clutch member is initially proportional to that displacement, but decays with a time constant that depends on the values of resistor $R_4$ and capacitor $C_4$.

A further tertiary control term is produced by a potentiometer $P_5$ controlled by the displacement of the elevator 26. A voltage that is substantially a measure of the rate of displacement of the elevator is fed to the input terminals of the amplifier by connecting the adjustable tapping of this potentiometer to the live input terminal 13 of the amplifier $A_1$ through a capacitor $C_5$ and a resistor $R_5$.

The addition of a number of control terms at the input terminals of the amplifier $A_1$ in such a way that each of the signals is dependent on the setting of the potenionmeter producing it and the impedance of the connection between that potentiometer and the input terminals of the amplifier, but not on the setting of any of the other potentiometers or on the impedances of any of the other connections, is made possible by the feed-back connection from terminal 17 of amplifier $A_1$ through capacitor $C_A$ and resistor $R_A$ to the input terminal 13 which operates to reduce the input impedance of the amplifier in the manner described and claimed in co-pending application No. 104,862, now patent No. 2,644,427 to Hugh B. Sedgfield, Frederick A. Summerlin and George H. Kyte, for Servo System dated July 7, 1953. With such a control system one input term to the amplifier is derived from the barometric pressure and precise control of the angle of elevation of the flight path is thereby obtained.

From the consideration of the fact that in the steady state the system adjusts itself so that the algebraic sum of the input signals to the amplifier is zero, it follows that $$\theta = \theta_1 + \theta_h$$
$$\therefore \theta_h = \theta - \theta_1$$

but $$\theta_1 = \theta_f$$
$$\therefore \theta_h = \theta - \theta_f$$

from Equation 1

$$\theta - \theta_f = \alpha$$

thus $$\theta_h = \alpha$$

It will be apparent that in any transient state involving a change of the angle of attack $\alpha$ there will result a corresponding change in the height error $\theta_h$ involving temporary departure from the required angle of flight path $\theta_f$. To remove these undesirable features a secondary control term providing a computed angle of attack compensation $\alpha_c$ is made an input term to the amplifier. The effect of this being to improve the control of the aircraft during transient conditions associated with changes of the angle of flight path or changes of speed. A sixth potentiometer $P_6$ and its padder resistor X are placed across the supply line 11 and 12 of Fig. 1, the potentiometer $P_6$ is controlled by a shaft connected to an air-speed-measuring device $AM_2$ which may be of any known kind. The control term $\alpha_c$ derived from $P_6$ may be fed via star addition resistor $R_6$ into the amplifier $A_1$. In the steady state the net signal at the amplifier $A_1$ input is zero. Consequently $$\theta = \theta_1 + \theta_h + \alpha_c$$

If computed height $h_c$ is equal to the true height $h$, the error signal $\theta_h$ is zero in that the cause of a steady height error—viz. angle of attack $\alpha$ has been compensated for by computed angle of attack compensation $\alpha_c$.

Thus $$\theta = \theta_1 + \alpha_c$$

Further, if the computed angle of attack $\alpha_c$ is equal to the true angle of attack $\alpha$, then $$\theta = \theta_1 + \alpha$$

From Equation 1

$$\theta = \theta_f + \alpha$$
$$\therefore \theta_1 + \alpha = \theta = \theta_f + \alpha$$
$$\therefore \theta_f = \theta_1$$

Thus the angle of elevation of the flight path equals the command angle.

It will be seen from this that the angle of elevation of the flight path $\theta_f$ is still equal to the command angle $\theta_1$ set in on the pilot's controller, with the additional advantage that the height error is substantially eliminated.

Consider now the use of the invention in the case of a flight director system Fig. 2. If a new command angle, the angle of elevation for the flight path of the aircraft is set in on the pilot's controller 10 to potentiometer $P_1$ the horizontal pointer 101 of the cross pointer indicator 102 is at first displaced from the zero position by an amount and in a direction that depends on the magnitude and sense of this angle. The pilot then operates his controls until the cross pointer 101 is brought back to its zero position i.e. until the signal supplied to the amplifier $A_1$ from the first potentiometer $P_1$ is matched by the signal from the gyro vertical $G_1$. As a result the aircraft follows a flight path which differs from the desired flight path by the angle of attack of the aircraft and after a time there will be an appreciable difference between the actual height of the aircraft and the computed height. Consequently an error signal will be fed to the amplifier $A_1$ which will operate to move the pointer 101 in such a direction that the pilot in controlling his craft to return the pointer 101 to zero will make the new angle of elevation of the flight path more nearly equal to the desired angle of elevation. A height error signal $\theta_h$ is provided by means identical with that shown in Fig. 1. A potentiometer $P_3$ is in cascade with potentiometer $P_1$ and the pointer is moved by airspeed indication device $AM_1$. The voltage from $P_3$ is fed to an integrating motor 19 which is coupled via a non-linear linkage such as a cam 21 to a bellows 20 provided with an E pick-off 22 and armature 22a. The height error signal $\theta_h$ is taken from the E pick-off 22 and fed to the live input terminal 13 of the amplifier $A_1$. A further signal representing the pilot's command angle is fed via the modulator $M_1$ and resistor $R_1$ to the live input terminal 13. Other signals are also fed into the amplifier, viz: the vertical gyro pitch signal $G_1$ and a radio signal, such as the signal for I.L.S. glide path. The signals for the vertical pointer 103 are not considered here, as they are not relevant to the discussion of the present invention.

The output of the mixing amplifier $A_1$, from terminals 14, 15, is fed to a phase-sense-sensitive rectifier 104 which provides an output in the form of a voltage that is dependent in magnitude and polarity on the algebraic sum of the various control quantities applied to the mixing amplifier $A_1$. The output of the phase-sense-sensitive rectifier 104 is fed to one of the operating coils 105 of the cross pointer centre-zero indicating instrument 102 in such a way that the pointer 101 is in its zero or horizontal position when the algebraic sum of the control quantities supplied to the input terminals of the mixing amplifier $A_1$ is zero, indicating that the aircraft is following the desired path.

Since many changes could be made in the above construction and many apparently widely different embodiments of this invention could be made without departing from the scope thereof, it is intended that all matter contained in the above description or shown in the accompanying drawings, shall be interpreted as illustrative and not in a limiting sense.

What is claimed is:

1. Aircraft navigation apparatus including a pitch angle measuring device producing a first primary signal ($\theta$), settable means for presetting a desired flight path angle ($\theta_f$) and for producing a second primary signal ($\theta_1$), means controlled from a combination of said two primary signals ($\theta$ and $\theta_1$) and a third primary signal ($\theta_h$), said third primary signal ($\theta_h$) being produced by means comprising means for supplying a signal dependent on craft airspeed, a barometric means, and means including a motor for varying the position of said barometric means in accordance with a desired rate of change of altitude corresponding to said desired flight path angle setting, said motor being connected to be controlled by said primary signal ($\theta_1$) and said secondary signal, and said third primary signal ($\theta_h$) being dependent upon the error between the actual instantaneous height of the craft as determined by the barometric means and the desired instantaneous height of the craft as determined by operation of said motor.

2. Aircraft control apparatus comprising means for providing first and second signals proportional respectively to a desired angle of the flight path of the aircraft and the airspeed of the aircraft, multiplying and integrating means responsive to said first and second signals for supplying a third signal proportional to the time integral of the product of said first and second signals whereby to provide a measure of the desired instantaneous altitude of the craft corresponding to said desired flight path angle, barometric means responsive to the actual instantaneous altitude of the aircraft and said time integral signal for providing a fourth signal variable in accordance with the difference between said actual instantaneous altitude of the craft and said desired instantaneous altitude, means for providing a fifth signal in accordance with the pitch attitude of the aircraft, and combining means responsive to said first, fourth, and fifth signals for supplying an output in accordance with the algebraic sum thereof.

3. Aircraft control apparatus of the character set forth in claim 2 further including a servo system for controlling the pitch attitude of the aircraft, and means for supplying the output of said combining means to said servo system.

4. Aircraft control apparatus of the character set forth in claim 2 further including an indicator having a pointer deflectable from a reference position, and means responsive to the output of said combining means for deflecting said pointer to one side or the other of said reference position.

5. Aircraft control apparatus of the character set forth in claim 2 wherein said integrating means comprises a motor and wherein said barometric means comprises an aneroid bellows having a pick-off associated therewith for normally supplying a signal in accordance with the actual instantaneous height of the aircraft, and coupling means between said motor and said aneroid bellows for modifying the operation of said aneroid bellows in accordance with the operation of said motor whereby to modify the signal produced by said pick-off.

6. Apparatus as set forth in claim 5 wherein said aneroid bellows has a non-linear response to changes in craft altitude and wherein said coupling means comprises a non-linear device for compensating for said non-linear response of said aneroid bellows to the change in altitude of said aircraft.

7. Apparatus as set forth in claim 2 further including means for supplying a compensating signal to said summing means variable in accordance with the product of the square of the airspeed of the craft and the density of the ambient air whereby the output of said summing means is further varied in accordance with changes in the angle of attack of the aircraft for any altitude thereof.

8. Apparatus by which an aircraft may be controlled to follow a flight path making a predetermined angle with respect to the geo-horizon comprising, means for providing a first signal in accordance with said desired flight path angle, means responsive to the airspeed of the craft and said first signal for supplying a second signal proportional to the product of said first signal and the craft airspeed whereby to provide a signal dependent upon a desired vertical velocity of said craft, barometric means responsive to the actual vertical velocity of the craft, means for providing a signal in accordance with the difference between the desired vertical velocity of the craft and the actual vertical velocity of the craft, means for providing a signal in accordance with the pitch attitude of the craft, and means responsive to said first signal, said difference signal, and said pitch attitude signal for supplying an output signal variable in accordance with the algebraic signal thereof.

9. Aircraft navigation apparatus comprising means for providing a first signal variable in accordance with the pitch attitude of the craft, adjustable means for providing a second signal representative of a desired angle of the flight path of the craft with respect to the horizontal, barometric means responsive to the instantaneous altitude of the craft, means for providing a measure of the airspeed of the craft, motive means coupled with said barometric means and responsive to said first signal and said airspeed measure for altering the operation of said barometric means in accordance with the desired instantaneous altitude of the craft, means responsive to the resultant operation of said barometric means for providing a third signal variable in accordance with the error between the actual instantaneous height of the aircraft as determined by said barometric means and the desired instantaneous height of the aircraft as determined by the operation of said motive means, and means responsive to said first, second, and third signals for providing an output signal in accordance with the algebraic sum thereof whereby if said craft is controlled in a manner to maintain said output signal at zero said craft will follow a flight path making the desired angle with respect to the horizontal.

10. Apparatus as set forth in claim 1 wherein said controlled means comprises an indicator responsive to said three primary signals.

11. Apparatus as set forth in claim 1 wherein said controlled means comprises a servo system for controlling the pitch attitude of the aircraft connected to receive said three primary signals.

References Cited in the file of this patent

UNITED STATES PATENTS

| 2,415,092 | Frische et al. | Feb. 4, 1947 |
| 2,507,304 | Hofstadter | May 9, 1950 |
| 2,620,149 | Strother | Dec. 2, 1952 |
| 2,701,111 | Schuck | Feb. 1, 1955 |

FOREIGN PATENTS

| 619,055 | Germany | Sept. 23, 1935 |